Nov. 8, 1938.   J. KUCHAR   2,135,820
VEHICLE
Filed March 8, 1937   3 Sheets-Sheet 1

Inventor.
Joseph Kuchar
By Williams, Bradbury, McCaleb & Hinkle
Attys.

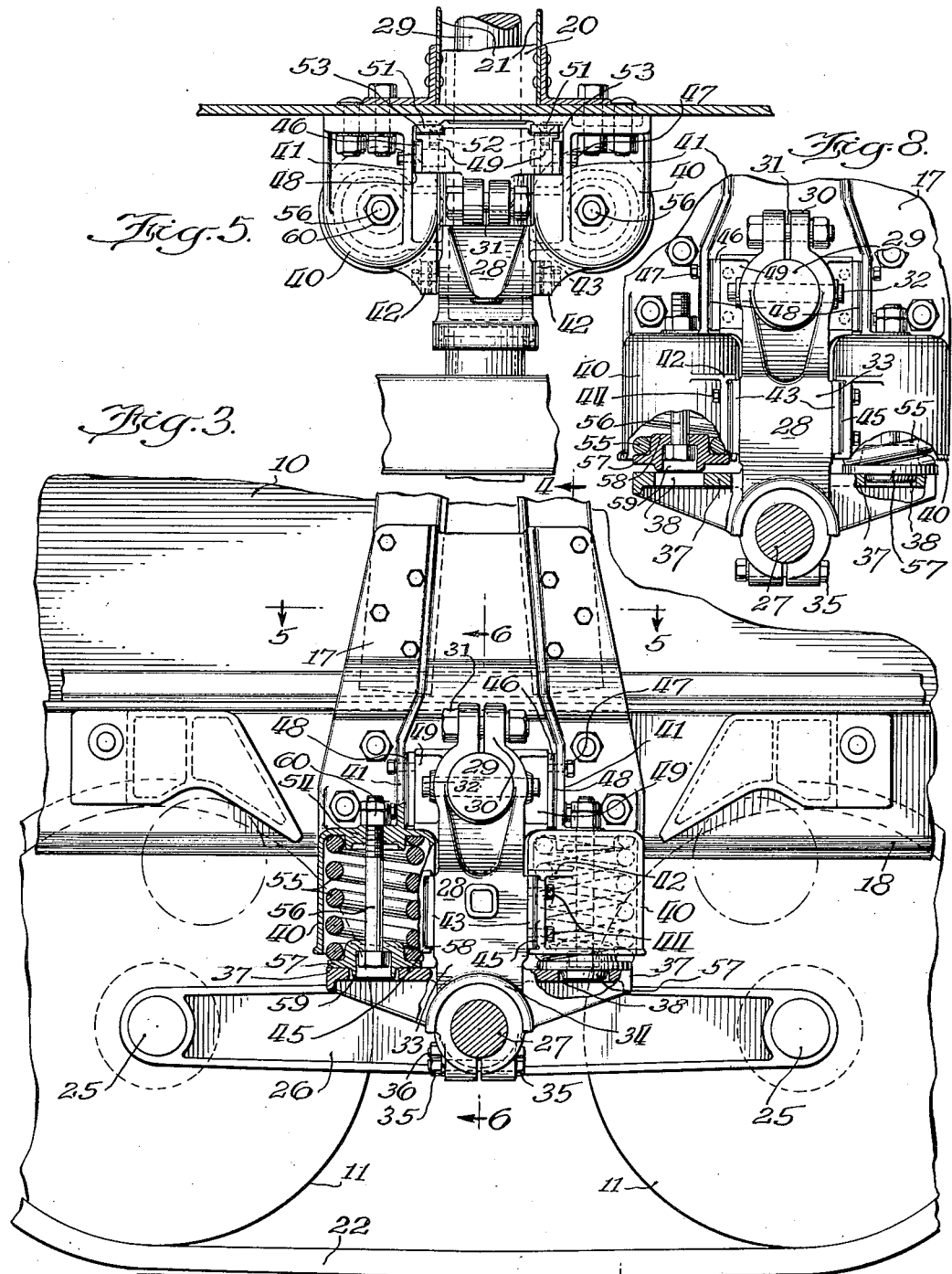

Nov. 8, 1938. J. KUCHAR 2,135,820
VEHICLE
Filed March 8, 1937 3 Sheets—Sheet 3
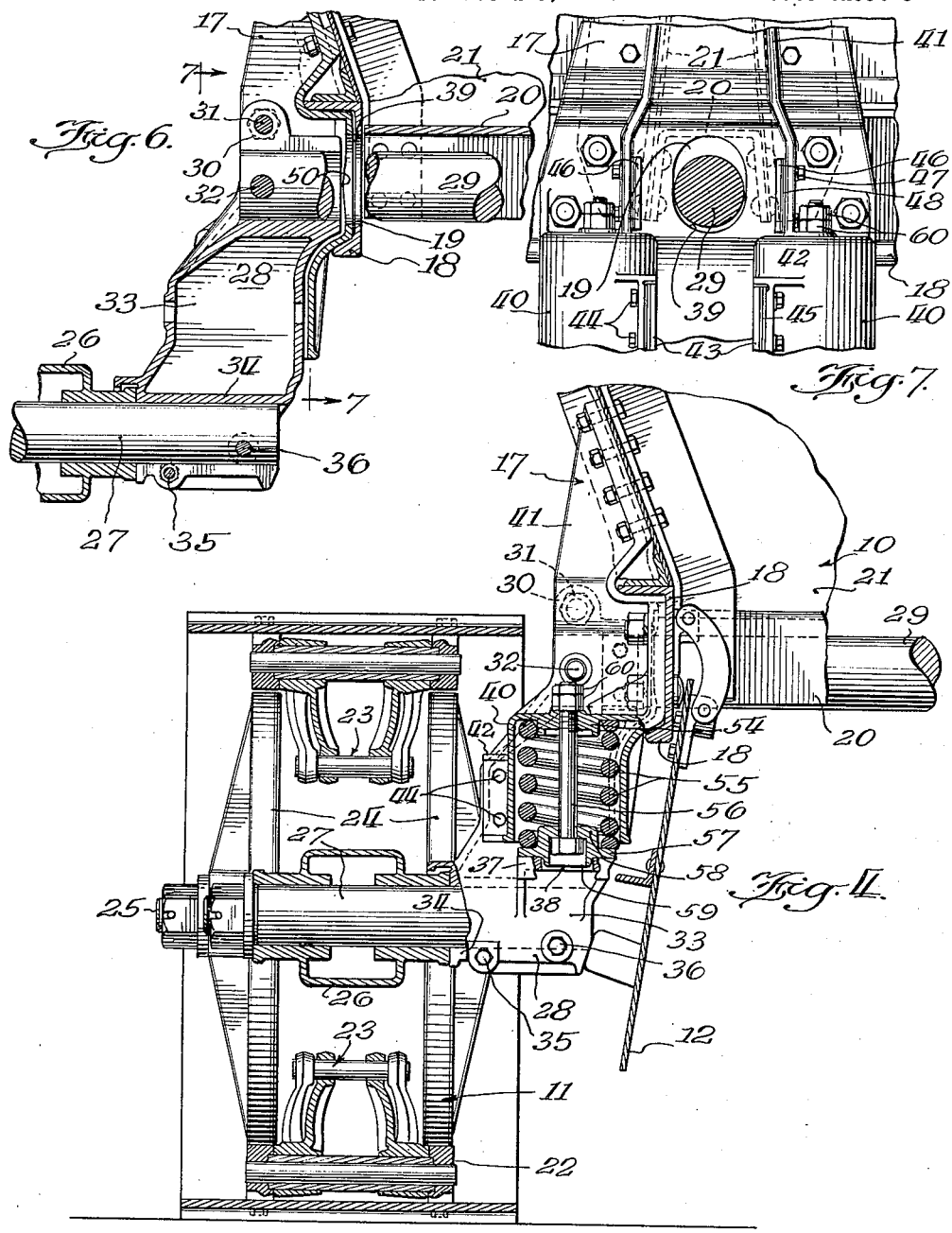

Patented Nov. 8, 1938

2,135,820

UNITED STATES PATENT OFFICE 2,135,820

VEHICLE

Joseph Kuchar, Chicago, Ill., assignor to Athey Truss Wheel Co., Chicago, Ill., a corporation of Illinois Application March 8, 1937, Serial No. 129,613

5 Claims. (Cl. 280—124)

This invention relates to vehicles and particularly to heavy vehicles which are constructed to take very heavy loads.

The principal object of the invention is to provide an improved spring mounting for vehicles of this type, a spring mounting which, in spite of the heavy loads which it must bear, can be easily constructed and installed.

A further object of the invention is to provide a spring mounting for heavy vehicles so that the failure of the springs or any of them will result in very slight displacement of the body with respect to the supporting wheel structure and the positive support of the vehicle body until such time as the spring may be replaced.

Other objects, advantages, and capabilities of the invention will appear from the following description of a preferred embodiment thereof, taken in conjunction with the accompanying drawings, in which:

Fig. 3 is a side elevation of the spring mounting at one side of the vehicle, certain parts being shown in section for the ready understanding of the device and the supporting wheel structure on the adjacent side of the vehicle being omitted.

Fig. 4 is a fragmentary sectional view through the wagon and wheel structure on one side thereof, taken on the broken line 4—4 of Fig. 1;

Fig. 5 is a fragmentary sectional plan view, taken on the line 5—5 of Fig. 3;

Fig. 6 is a sectional detail view, taken on the line 6—6 of Fig. 3;

Fig. 7 is a fragmentary elevational view, taken on the line 7—7 of Fig. 6, with the axle bracket and supporting brackets removed, and Fig. 8 is a fragmentary elevational detail view showing the manner in which the springs are compressed for assembly.

Figure 2:
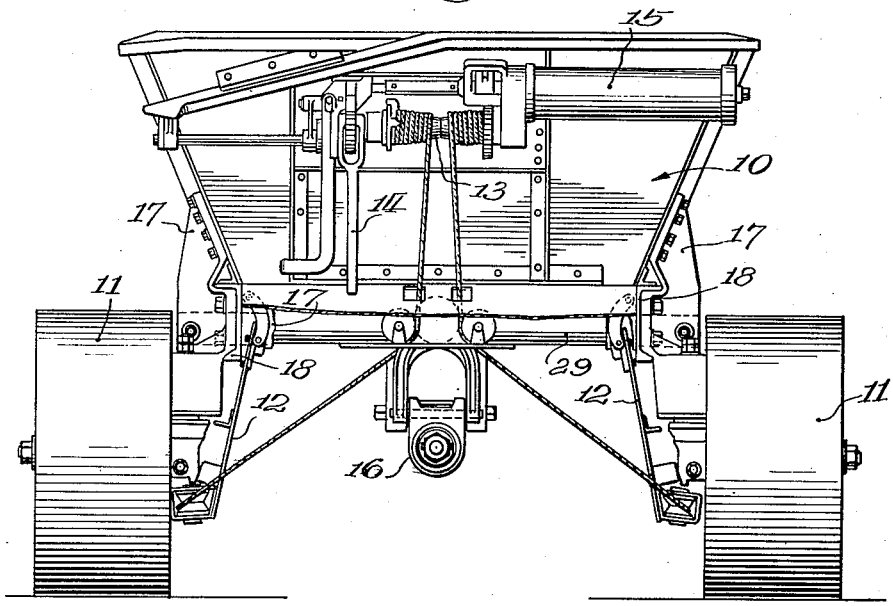
Fig. 2 is a rear elevation of the vehicle.
Figure 1:
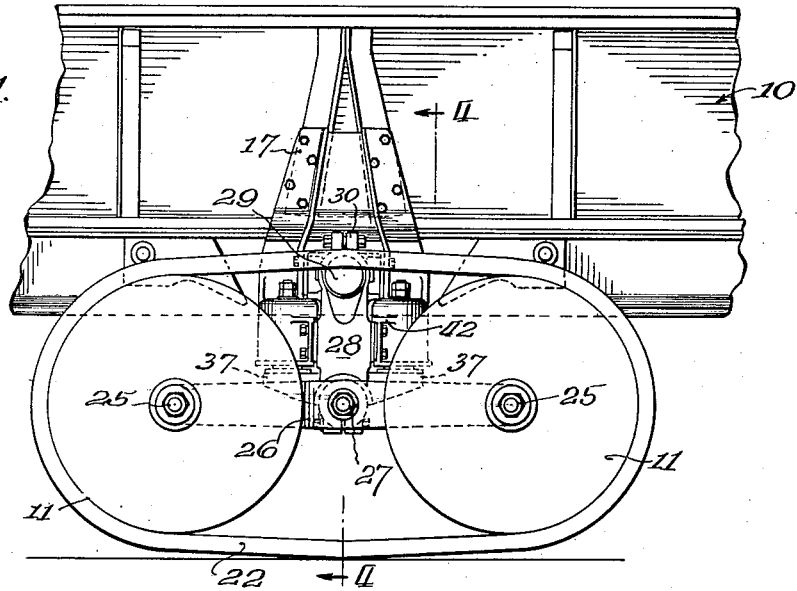
Figure 1 is a fragmentary side elevation of a vehicle embodying my invention.

Referring to the accompanying drawings, the reference numeral 10 designates the body of a wagon or trailer which is supported on a pair of track laying wheels 11 by means of the spring mounting which is the principal subject-matter of the present invention. This spring mounting presents especially difficulties since wagons of the type illustrated are adapted to carry very heavy loads, of the order of 10, 15 and even 30 tons, in addition to weighing very considerably when unloaded. With loads of the magnitude indicated, and use on rough terrain, for which these wagons or trailers are primarily intended, the shocks incurred in ordinary use are extremely large and are a cause of excessive wear and failures of these heavy duty wagons.

The particular wagon shown herein is a bottom dump wagon, the bottom of which is constituted by doors 12 which are mounted so as to swing downwardly into the position shown in Fig. 2. The doors are adapted to be closed by means of a drum 13 which can be actuated by means of a hand lever 14 or by means of a spring contained within the housing 15, all in the manner described and claimed in my copending application Serial No. 656,819 filed February 15, 1933. This wagon is a trailer adapted to be hauled by a tractor, or the like, by means of a draft arm 16. The wagon is of the "cart" type and is supported by a pair of wheel structures 11, one on each side. Adjacent the center of these wheel structures the wagon body is provided on each side with a supporting bracket 17 which projects downwardly beyond the main side frame members 18 of the wagon. Between these brackets the side frame members 18 are provided with vertically elongated openings 19 for the purpose hereinafter to be described. The two side frame members 18 are bridged across by an inverted U beam 20 which is arranged to clear the openings 19, as best seen in Fig. 7. The U beam 20 is enclosed by upwardly converging plates 21 which divide the body of the wagon into two compartments and enables all of the load to be discharged when the doors are opened.

The track laying wheels 11 may suitably be of the kind described and claimed in my Patent No. 1,946,798 issued February 13, 1934. Such track laying wheels or wheel structures comprise a track 22, of which the lower length serves as an inverted bridge, being prevented from bending upwardly by means of truss elements 23 with which the track is provided on its inner side. The track 22 rides around two pairs of wheels 24 which are carried on stub axles 25 at opposite ends of a beam 26. The beams 26 of the two wheel structures 11 are pivotally mounted at their center upon stub axles 27 located on either side of the wagon. The stub axles 27 are rigidly mounted in the lower portions of end members 28.

The upper ends of the two end members 28 on opposite sides of the wagon are rigidly connected together by means of an axle 29. The axle 29 may extend into split sleeves 30 at the upper ends of the end members 28. These sleeves are tightly closed by means of bolts 31 so that they firmly embrace the axle 29. To prevent any tendency for the end members 28 to rotate, pins 32 are provided, which pins pass through both the sleeve 30 and the axle 29. Below the sleeve 30 the end member 28 is provided with a strong box-like portion 33. The lower end of the end member 28 is provided with a split sleeve 34 which is adapted to receive the stub axle 27.

The stub axle 27 is secured to the end member 28 by means of bolts 35 and pins 36. Immediately above and on either side of the stub axle 27, the end member is provided with two laterally extending brackets 37, each of which is provided with a circular opening 38. The end member 28 may advantageously consist of a single casting. The axle 29 extends through the openings 19 in the side frame members 18 and extends across the wagon through the inverted U beam 20.

Each supporting bracket 17, which is bolted to one side of the body of the vehicle adjacent the axle position, is provided with an opening 39 in alignment with the opening 19 and is provided with two brackets 40 preferably in the form of integral inverted cup members which are adapted to be in alignment with the openings 38 on the brackets 37 previously referred to. These cup members are located adjacent the lower end of the supporting bracket 17 and vertical webs 41 extend upwardly from their upper ends.

Webs 42, integral with the inverted cup members 40, extend outwardly therefrom and serve as supports for bearing blocks 43 which are secured to the webs 42 by means of bolts 44. These bearing blocks 43 bear against the forward and rear sides of the end member 28. Suitable shims 45 are located between the bearing blocks 43 and the webs 42 so as to arrange a close working clearance which enables the end member 28 to move somewhat in the upward or downward direction relative to the vehicle body. Bearing blocks 46 are mounted by means of bolts 47 upon the inner sides of the webs 41 in positions which are upward and inward with respect to the inverted cup members 40. The bearing blocks 46 are located by means of shims 48 so as to engage wing portions 49 of the end members 28 and provide a close working fit for the movement of the end member relative to the body of the vehicle in the vertical direction. The wing portions 49 are located on either side of the axle 29.

On either side of the axle 29 the bracket 17 is provided with convex cylindrical portions 50, the cylindrical axis being horizontal. The convex formations 50 are adapted to engage bearing blocks 51 carried by the wings 49 of the end member 28. The bearing blocks 51 are secured to the inner faces of the wings 49 by means of screws 52 and are located in proper relation with the aid of shims 53.

The inverted cup members 40 are provided with bosses 54 in their upper horizontal walls which are provided with axial openings in alignment with the openings 38 in the brackets 37 carried by the end member 28. Powerful coil springs 55 are located within the inverted cup members 40. Bolts 56 extend through the openings in the bosses 54 downwardly through the springs 55 and through disc members 57 which are adapted to rest upon the brackets 37. The disc members 57 are provided with central bosses 58 and are engaged around these bosses by the lower convolutions of the springs 55. The undersides of the disc members 57 are provied with annular projections 59 which normally enter into the openings 38 as shown in Fig. 3 and on the right-hand side of Fig. 8. The bolts 56 have their heads located in recesses in the disc members 57 and are provided with nuts 60 on the upper side of the inverted cup members 40.

In assembling the axle of the wagon, the supporting brackets 17 are secured to the body of the wagon. The springs 55 are contracted by operation of the nuts 60 and the axle 29 is located within the openings 19 and 39 so that its ends project on either side of the wagon. The sleeves 30 are then slid over the ends of the axle 29 and are secured thereto in proper relation. It will, of course, be understood that the bearing blocks 43, 46 and 51 are adjusted as may be needed by means of the shims associated therewith to give the proper working fit. The springs 55 being in the contracted relation shown in the left-hand side of Fig. 8, the brackets 37 may be slid inwardly so that the openings 38 are brought into alignment with the annular projections 59 on the disc members 57. After the end members 28 are secured to the axle 29, the nuts 60 are backed up on the bolts 56 and the springs 55 expand and firmly seat the disc members 57 on the brackets 37. When this occurs the axle 29 is located at or very close to the lower end of the vertically elongated openings 19 and 39.

It will readily be understood that in the normal operation of the spring mounting the body may move relative to the wheel structures against the compression of the springs 55. Relative vertical movement is permitted by the engagement of the bearing blocks 43 and 46 against vertical faces of the end members 28. Swaying movement of the body 10 relative to the wheel structures is permitted by the convex frames 50 on the supporting brackets 17. In case it is necessary to renew the springs 55, the disc members 57 are drawn upwardly by the nuts 60, the sleeve 30 is freed from the axle 29, and the end member 28 is moved outwardly. The nuts 60 are then removed from the bolts 56. The springs are then replaced and the end member 28 is reinstalled in the manner above described.

It will be noted that in case the springs 55 are broken when the wagon is loaded, the cup formations 40 will merely move downwardly into engagement with the brackets 37 and will rest thereon until the springs are replaced. The elongation of the openings 19 and 39 in the vertical direction permits sufficient motion for this relative movement to occur.

Although the invention has been described in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. A spring mounting for heavy vehicles comprising an axle moving with respect to the body and comprising a transverse member and end members removably secured thereto, brackets on either side of said end members provided with openings, brackets on said body in superposed and spaced relation to first said brackets, independent disc members having downwardly directed formations whereby they may be seated on first said brackets, compression springs located between each body bracket and disc member, said body brackets and disc members being formed to maintain said springs in position, and contractible means connecting said body brackets and said disc members whereby the springs may be compressed and the discs may be elevated from the axle brackets to permit the adjacent end member to be removed from the axle.

2. A spring mounting for heavy vehicles, comprising an axle movable with respect to the body and comprising a transverse member and end members removably secured thereto, brackets on either side of said end members provided with openings, brackets on said body in superposed and spaced relation to first said brackets, disc members separate from the first said brackets having downwardly directed formations whereby they may be seated on first said brackets, a compression spring located between each body bracket and disc member, said body brackets and disc members being provided with bosses to maintain said springs in position, and bolts connecting said body brackets and said disc members whereby the springs may be compressed and the discs elevated to permit the adjacent end member to be removed from the axle 3. A spring mounting for heavy vehicles comprising an axle movable with respect to the body and comprising a transverse member and end members removably secured thereto, brackets on either side of said end members provided with openings, brackets on said body in superposed and spaced relation to first said brackets, disc members having downwardly directed formations whereby they may be seated on first said brackets, said disc members being freely mounted on first said brackets, a compression spring located between each body bracket and disc member, said body brackets and disc members being provided with bosses to maintain said springs in position, bolts connecting said body brackets and said disc members whereby the springs may be compressed and the discs elevated to permit the adjacent end member to be removed from the axle, and bearing surfaces on said axle and body for maintaining them in working relation.

4. A spring mounting for heavy vehicles comprising an axle movable with respect to the body and comprising a transverse member and end members removably secured thereto, bracket members mounted on each side of the vehicle body and provided with vertically elongated openings through which passes the transverse member of the axle, said bracket members being provided with vertically directed channel formations receiving the end members in sliding relation, brackets carried by said end members on each side of the axle, said brackets being provided with openings, disc members having projections whereby they are seated on said brackets, inverted cups carried by said bracket members above and in spaced relation to said brackets, coil springs within said cups seated therein and on said discs, and means for compressing said springs.

5. A spring mounting for heavy vehicles comprising an axle movable with respect to the body and comprising a transverse member and end members removably secured thereto, bracket members mounted on each side of the vehicle body and provided with vertically elongated openings through which passes the transverse member of the axle, said bracket members being provided with vertically directed channel formations receiving the end members in sliding relation, brackets carried by said end members on each side of the axle, said brackets being provided with openings, disc members having projections whereby they are seated on said brackets, inverted cups carried by said bracket members above and in spaced relation to said brackets, coil springs within said cups seated therein and on said discs, and means for compressing said springs, said bracket members being provided with a curved bearing surface adjacent its opening, which surface is adapted to engage the adjacent end member.

JOSEPH KUCHAR.